Aug. 18, 1964     V. E. SCAFURO     3,145,168
AQUARIUM TANK FILTER DEVICES
Filed Dec. 10, 1962
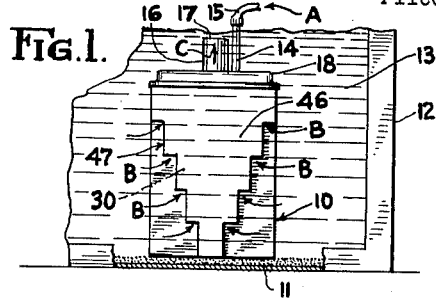
FIG.1.
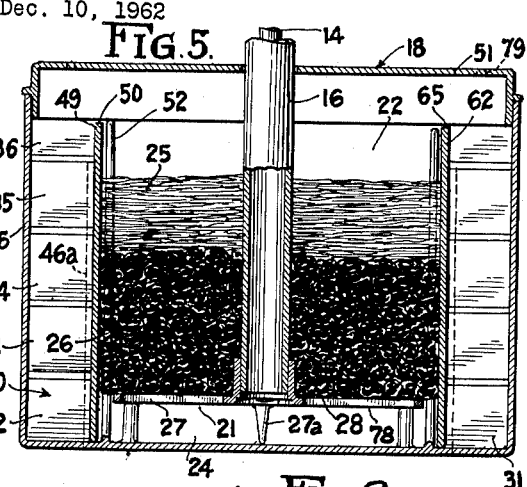
FIG.5.
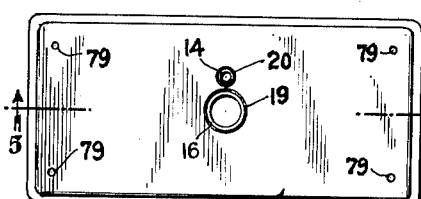
FIG.3.
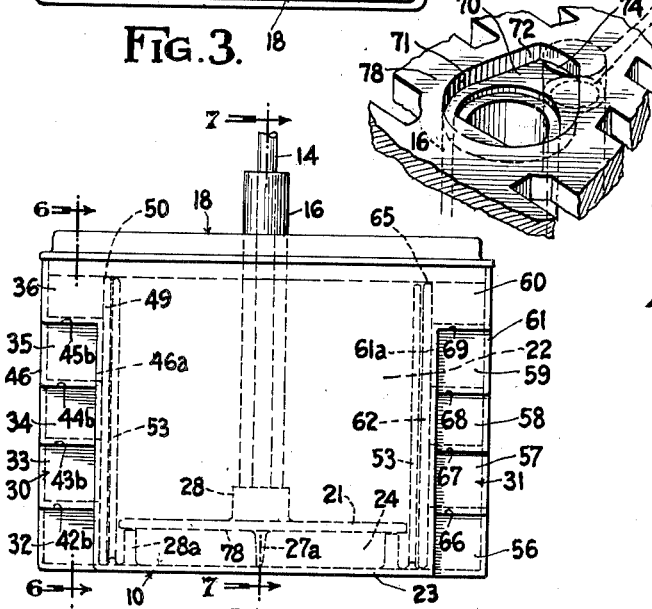
FIG.2.
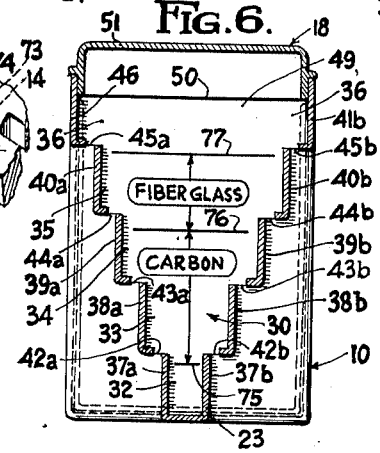
FIG.8.    FIG.6.
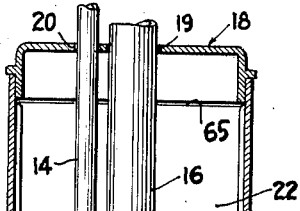
FIG.7.
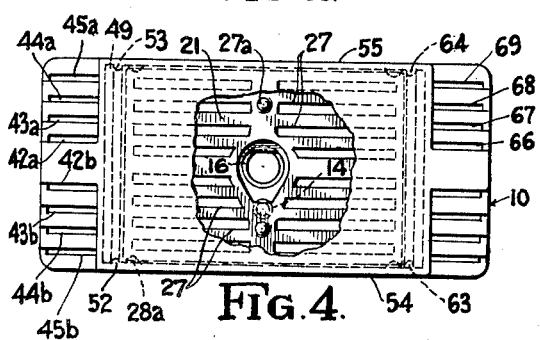
FIG.4.
INVENTOR
VICTOR E. SCAFURO
BY
ATTORNEY United States Patent Office 3,145,168
Patented Aug. 18, 1964

3,145,168
AQUARIUM TANK FILTER DEVICES
Victor E. Scafuro, Allendale, N.J., assignor to Sternco Industries, Inc., Allendale, N.J., a corporation of New Jersey
Filed Dec. 10, 1962, Ser. No. 243,396
5 Claims. (Cl. 210—169)

This invention relates to aquarium tank filter devices, and is particularly directed to devices of this category adapted to contain water filtering and purifying material and having means to direct the water from the tank through such material and back again into the tank.

In conventional devices of this class, a filtering chamber is contained within a casing that is positioned upon the floor of the tank, the water inlet portion being at the top of the casing. The arrangement is hence such that the pump or other means employed to direct the water into the filter device must raise the water to the top of the casing. It has been found that in such devices only the upper portion of the tank water is purified, and that a considerable portion of the dirt in the tank remains at the bottom thereof unless a very powerful pump is employed. It is one of the objects of this invention to provide a water filtering and purifying device that does not have this shortcoming, an objective which is accomplished by a novel arrangement of inlet ports and water flow compartments at various levels, so that the debris in the tank enters the device at selected levels between the top and bottom of the device, whereafter the dirt-laden water flows up through said compartments to the tops of walls acting as weirs, the water flowing over the weirs and then down through the filtering and cleansing media, and then upwardly to an outlet pipe leading to the top of the device. It has been found that with this novel construction, with inlet openings distributed over various regions and aggregating a comparatively large inlet area, effective water purification of an entire tank can be obtained with relatively low-power pumping action.

It is another object of this invention to employ air as the pumping medium in association with a novel arrangement of inlet and outlet ports so as to effect an extremely efficient pumping action without interfering with the free flow of the water being pumped.

Another object of my invention is the provision of an aesthetically attractive and low-cost device having the advantages above mentioned.

Other objects, features and advantages will appear from the drawings and the description hereinafter given.

Referring to the drawings,

FIG. 1 is a fragmentary side elevational view of an aquarium tank within which is disposed a filter device according to one form of my invention, an end view of said device being illustrated, a fragment of the tank being broken away for clarity, arrow A showing the direction of the incoming air, the arrows B showing the direction of water entering the filtering device at different levels, and arrow C showing the direction of the out-flowing filtered and purified water.

FIG. 2 is a front view of said filtering device.

FIG. 3 is a top view thereof.

FIG. 4 is a bottom view thereof, a portion of the base being broken away for clarity.

FIG. 5 is a section of FIG. 3 taken along lines 5—5, showing layers of fiber glass and carbon granules as the water filtering and purifying media.

FIG. 6 is a section of FIG. 2 taken along line 6—6.

FIG. 7 is a section of FIG. 2 taken along line 7—7, portions of the air supply and water outlet pipes being shown in elevation.

FIG. 8 is an enlarged fragmentary bottom perspective view of the grate underlying and supporting the purifying material and constituting the floor of the filtering chamber, the view also showing associated air and water conduits.

In the illustrated embodiment of this invention, the casing 10 is shown resting upon the bottom portion 11 of the aquarium tank 12, the casing being shown immersed in the water 13, the air inlet pipe 14 being attached to a hose 15 connected to a suitable source of air supply (not shown) such as a pump of the type generally used for such purposes, the water outlet pipe 16 having its upper outlet end 17 preferably immersed within said water. The said casing 10 has the cover 18 which is provided with the apertures 19 and 20 through which extend said water outlet pipe 16 and said air inlet pipe 14, respectively. Said pipes are operatively connected to the slotted wall 21 removably positioned at the bottom of the purifying chamber 22 and spaced over the base 23 of the casing 10, the arrangement being such as to provide an outlet chamber 24 with which the said pipes 14 and 16 and said filter chamber are in operative communication, in a manner to be hereinbelow described. The said wall 21 underlies and supports a layer 25 of filtering material, such as fiber glass, and a layer 26 of purifying material, such as carbon granules, both of said materials being hereinafter referred to, for the purpose of this application, as purifying material. In the preferred form illustrated, said wall 21 has therein a plurality of slotted portions 27, thereby constituting a grated floor for said filtering chamber 22, said floor being maintained in proper predetermined spaced relation to said base 23 by the spacing pins 27a extending down from said grated floor 21 and the supporting posts 28a extending up from said base 23. Extending upwardly from the floor-grate 21 are the hollow bosses 28 and 29, the former accommodating therein the water pipe 16 and the latter the air pipe 14, said pipes, in the preferred embodiment shown, being fixedly secured to said bosses so that said pipes and grate can be inserted into the casing 10 as a unit and can similarly be lifted out of the casing, together with the supported purifying material, when the latter is to be replaced.

At the opposite sides of the casing 10 are the two lateral water inlet chambers 30 and 31, each having stepped inlet ports at different levels leading into compartments—sections of said inlet chambers—of progressively increasing widths in an upwardly direction. Specifically, the chamber 30 comprises the narrowest section 32 (see FIG. 6) at the lowermost portion thereof, and the successive upper sections 33, 34, 35 and 36 of progressively increasing widths. The width of said section 32 is defined by the front and rear wall sections 37a and 37b, the width of section 33 by the front and rear wall sections 38a and 38b, the width of section 34 by the front and rear wall sections 39a and 39b, the width of section 35 by the front and rear wall sections 40a and 40b, and the width of section 36 by the front and rear wall sections 41a and 41b. Between wall sections 37a, 37b and 38a, 38b and in a horizontal plane are the respective inlet ports 42a and 42b; between wall sections 38a, 38b and 39a, 39b are the respective inlet ports 43a and 43b; between wall sections 39a, 39b and 40a, 40b are the respective inlet ports 44a and 44b; and between wall sections 40a, 40b and 41a, 41b are the respective inlet ports 45a and 45b. Said inlet chamber 30 and its said component sections are laterally flanked by the outer wall 46 with the stepped front and rear edges 47 and 48 (FIG. 1) and the inner wall 46a. In proximate relation to said inner wall 46a is the panel 49, the upper edge 50 of which is spaced below the top 51 of said cover 18, said top 51 constituting the roof of said purifying or filter chamber 22. Said top edge 50 of the panel 49 defines the top of the uppermost section 36 of the inlet chamber 30, the space between said top edge 50 and said roof 51 being sufficient to permit water to flow from said inlet chamber 30 over said edge 50, acting as a weir, into said filter chamber, in a manner to be set forth below.

In the preferred arrangement illustrated, there are inwardly extending ridges 52 and 53 on the inner surfaces of the respective rear and front walls 54 and 55 spaced sufficiently from said inner wall 46a to slidably accommodate therebetween said panel 49. The panel contains thereon the notations "Fiber Glass" and "Carbon," and lines 75, 76 and 77 indicating the limiting levels of the fiber glass and carbon granules—said notations and lines being visible when the casing 10 is made of transparent material.

The said oppositely positioned inlet chamber 31 is constructed identically like inlet chamber 30 above described, and it is accordingly deemed unnecessary to repeat such description. Suffice it to say that chamber 31 is of stepped configuration with sections 56, 57, 58, 59 and 60 corresponding to said sections 32 to 36 of chamber 30 and having the respective outer and inner walls 61 and 61a, there being a panel 62 slidably positioned between the ridges 63 and 64 and said inner wall 61a and having the upper weir edge 65, said chamber 31 having a plurality of front and rear inlet openings 66, 67, 68 and 69 corresponding to said openings 42a to 45a and 42b to 45b.

As can be seen from FIGS. 4, 7 and 8, the bottom of the slotted grade 21 has an upwardly recessed portion forming the cavity 70 defined by the peripheral wall 71 of generally cylindrical configuration with a laterally elongated portion 72 extending partly underneath the cavity 73 of the said boss 29, there being a narrow orifice 74 communicating between said cavities 70 and 73. As will be noted from FIG. 7, air inlet pipe 14 is in communication with cavity 73, and water outlet pipe 16 is in communication with cavity 70; hence said pipes are in communication with each other.

In the operation of this device, air is pumped through hose 15 into the inlet pipe 14 in the direction of arrow A (FIG. 1). The air then leaves the inlet pipe, entering the chamber 73 in boss 29 and emerging through the orifice 74. Since said orifice is above the level of the bottom surface 78 of the slotted wall 21 (FIG. 7) and is exposed directly to the chamber 70, the air leaving said orifice will tend to flow generally in the direction of the arrows D; and inasmuch as the outlet pipe 16 is close to the inlet pipe 14, a substantial portion of the air flowing from said orifice 74 will enter said pipe 16 and flow upwardly, thereby producing an upward current of water within said pipe 16. The lateral wall 71 and its elongated portion 72 also assist in this action in that they serve to confine portions of the air flowing from orifice 74 within the said chamber 70. Due to the coactive pumping action of the fluids within said pipes 14 and 16 and to the consequent upward current within said outlet pipe 16, the water that is within the outlet chamber 24 will be drawn upwardly into said outlet pipe. And since said outlet chamber 24 communicates through the slots 27 with the filter chamber 22, it is obvious that water in the latter chamber will flow downwardly through the purifying material 25 and 26, through the apertured grate 21, into said outlet chamber 24 and upwardly through said outlet pipe 16 in the direction of arrow C (FIG. 1), and then into the tank 12. The downward movement of the water in the filter chamber 22 will cause water to be drawn in through the aforementioned inlet ports 42a, to 45a, 42b to 45b, and 66 to 69 in the direction of arrows B (FIG. 1). The water entering through these ports carries with it sediment particles that float at or are drawn to the levels of said inlet ports. Streams of such sediment-laden water thus enter the two lateral water inlet chambers 30 and 31, the water in these chambers flowing upwardly through the said sections of progressively greater widths, due to the pull effected by the pumping action above described. In view of the fact that the panels 49 and 62 extend upwardly from the bottom wall 23 of the casing 10 to the upper portions of the sections 36 and 60 of the respective inlet chambers 30 and 31, the water will not enter the purifying chamber 22 except by flowing over the upper edges 50 and 65, respectively, of said panels 49 and 62. The said panels thus serve as weirs over which the upwardly moving masses of water in the respective inlet chambers 30 and 31 flow due to the pumping action above described.

It is thus evident that water from the aquarium tank 12 enters the filtering device 10 at various levels, all such entering water being directed to the top of the device and then downwardly through the fiber glass 25 and carbon granules 26, through the grate 21, into the outlet chamber 24, up through the outlet pipe 16 and out again, in purified condition, into the tank 12. It is further to be noted that since there are many inlet ports all communicating, through the inlet chambers 30 and 31, with the filter chamber 22, there is, in the aggregate, an extensive inlet area, thereby permitting a relatively low velocity flow through each of the ports, and thus enabling the water within the inlet chambers 30 and 31 to flow upwardly without any undue turbulence therein, and then downwardly to be subjected to gradual but thorough cleansing action. After the purified water enters the outlet chamber 24, it is enabled to enter the pipe 16 without interference by any obstructing elements, especially in view of the fact that the air orifice 74 is, as aforesaid, above the level of the bottom surface 78 of the slotted wall 21 and therefore in non-obstructing relation to the flow of the purified water into the outlet pipe. It has also been found that positioning the inlet orifices, such as 42a and 42b, in a substantially horizontal plane, enables the flow of water into the inlet chambers 30 and 31 to be effected with the least resistance. The vents 79 in the cover 18, serving to permit the escape of fluids therethrough, also facilitate the free flow of the water through the device.

Should it be desired to replace the purifying material 25 and 26 with new material, all that need be done is to grasp the upwardly extending portions of pipes 14 and 16, and lift them upwardly, whereby the grate 21 and the materials supported thereby will also be lifted out. And should it be desired to cleanse the panels 49 and 62, these can readily be removed since they are slidably supported in the manner above described.

In view of the fact that the stepped inlet chambers 30 and 31 are on opposite sides of the casing 10, water can be drawn into the device from the tank on both sides of the filtering unit, thereby effecting widespread purifying action.

It will further be observed that the stepped arrangement of the inlet chambers 30 and 31 on opposite sides of the tank create a balanced design that has considerable aesthetic value.

In the above description, the invention has been disclosed merely by way of example and in preferred manner; but obviously many variations and modifications may be made therein. It is to be understood, therefore, that the invention is not limited to any form or manner of practicing same, except insofar as such limitations are specified in the appended claims.

I claim:

1. In an aquarium tank device, a casing comprising a filter chamber, two water inlet chambers on laterally opposite sides of said casing, said latter chambers having sides of stepped formation with stepped portions at different levels, said sides having a plurality of horizontally extending wall portions and water inlet ports at said stepped portions, said inlet ports being positioned in said horizontally extending wall portions, each of said water inlet chambers being laterally flanked by an outer wall with stepped edges and an inner wall, a panel adjacent each of said inner walls and having an upper weir edge in the region of the upper portion of the adjacent inlet chamber, a cover on said casing, the top of said cover being in spaced relation to said upper weir edges of said respective panels, water purifying means in said filter chamber, an apertured grate at the bottom of said filter chamber and in underlying supporting relation to said water purifying means, said grate being in spaced relation to the bottom of said casing and forming a water outlet chamber between said grate and said bottom of the casing, and pumping means operatively connected to said outlet chamber for drawing water from said latter chamber out of said device, whereby water will be operatively drawn through said inlet ports into said respective inlet chambers and upwardly to said respective weir edges and into said filter chamber.

2. In an aquarium tank device, a casing comprising a filter chamber, a water inlet chamber laterally adjacent said filter chamber and having as an integral part thereof a plurality of horizontally extending wall portions at different levels, a plurality of water inlet ports positioned in said horizontally extending wall portions and communicating with said inlet chamber, water purifying means in said filter chamber, pumping means operatively connected to said filter chamber for drawing water from said latter chamber out of said device, the upper portion of said water inlet chamber being in communication with said filter chamber, whereby water will be operatively drawn, by the operation of said pumping means, through said inlet ports, into said inlet chamber and upwardly to said upper portion thereof and into said filter chamber.

3. In an aquarium tank device, a casing comprising a filter chamber, a water inlet chamber laterally adjacent said filter chamber and comprising a plurality of sections of different widths at different levels, certain of said sections of said water inlet chamber having horizontally extending wall portions, the lowest of said sections being narrowest and the sections thereabove being of progressively increasing widths, a plurality of water inlet ports positioned in said horizontally extending wall portions and communicating with said inlet chamber, water purifying means in said filter chamber, pumping means operatively connected to said filter chamber for drawing water from said latter chamber out of said device, the upper portion of said water inlet chamber being in communication with said filter chamber, whereby water will be operatively drawn by the operation of said pumping means through said inlet ports, into said inlet chamber and upwardly to said upper portion thereof and into said filter chamber.

4. In an aquarium tank device, the combination according to claim 3, said horizontally extending wall portions being disposed on opposite sides of their respective inlet chamber sections, whereby the opposite sides of said inlet chamber are of stepped configuration.

5. In an aquarium tank device, the combination according to claim 3, and a weir member between said water inlet chamber and said filter chamber and having its top portion disposed in the region of the uppermost of said inlet chamber sections, said weir member being so positioned with respect to said chambers that water operatively flowing upwardly in said inlet chamber will flow over the top of said weir member into said filter chamber.

References Cited in the file of this patent
UNITED STATES PATENTS

| | | |
|---|---|---|
| 2,491,853 | Feldman | Dec. 20, 1949 |
| 2,653,908 | Rodda | Sept. 29, 1953 |
| 2,782,161 | Willinger et al. | Feb. 19, 1957 |
| 3,006,476 | Halpert | Oct. 31, 1961 |